(12) United States Patent
Qian et al.

(10) Patent No.: US 9,203,207 B2
(45) Date of Patent: Dec. 1, 2015

(54) METHOD FOR FILTERING NOISES IN OPTICAL PARAMETRIC CHIRPED-PULSE AMPLIFIER AND DEVICE THEREFOR

(71) Applicant: SHANGHAI JIAO TONG UNIVERSITY, Shanghai (CN)

(72) Inventors: Liejia Qian, Shanghai (CN); Jing Wang, Shanghai (CN); Peng Yuan, Shanghai (CN); Jingui Ma, Shanghai (CN); Yongzhi Wang, Shanghai (CN); Guoqiang Xie, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 14/474,361

(22) Filed: Sep. 2, 2014

(65) Prior Publication Data

US 2015/0288132 A1      Oct. 8, 2015

(51) Int. Cl.
*H01S 3/00* (2006.01)
*G02F 1/39* (2006.01)
*H01S 3/10* (2006.01)

(52) U.S. Cl.
CPC .......... *H01S 3/10023* (2013.01); *H01S 3/0057* (2013.01); *H01S 3/10084* (2013.01); *G02F 2001/392* (2013.01); *G02F 2201/30* (2013.01); *G02F 2203/26* (2013.01)

(58) Field of Classification Search
CPC ............ H01S 3/0057; G02F 2001/392; G02F 2203/26; G02F 2201/30; G02F 1/39
See application file for complete search history.

(56) References Cited

U.S. PATENT DOCUMENTS

| | | | |
|---|---|---|---|
| 5,847,863 A * | 12/1998 | Galvanauskas et al. | ... 359/341.3 |
| 2006/0221449 A1* | 10/2006 | Glebov et al. | ................. 359/575 |
| 2010/0053733 A1* | 3/2010 | Falcoz et al. | ............... 359/337.5 |
| 2011/0297651 A1* | 12/2011 | Squier et al. | ............. 219/121.18 |

OTHER PUBLICATIONS

Valiulis et al., "Optical parametric amplification of chirped X pulses", Physical Review A, vol. 77, 043824, (2008).*
Jing Wang, Jingui Ma, Yongzhi Wang, Peng Yuan, Guoqiang Xie & Liejia Qian, Noise filtering in parametric amplification by dressing the seed beam with spatial chirp, Optics Letters, Apr. 15, 2014, 2439-2442, vol. 39, No. 8, ISSN 0146-9592.

* cited by examiner

*Primary Examiner* — Eric Bolda

(57) ABSTRACT

A method for filtering noises in an optical parametric chirped-pulse amplifier by a spatial-chirp-dressed seed beam is provided. The various noises that grow during amplification course, including parametric super-fluorescence, pump distortion-induced noise and surface-reflection-initiated pre-pulses, will not have the spatial and temporal chirp. After dechirping amplified signal with a compressor, a main pulse having its spatial and temporal chirp removed completely is produced, while the noises acquire an additional spatiotemporal coupling, making themselves highly distinguishable from signal in space, and hence supporting noise filtering effectively and expediently in spatial domain that would not be possible otherwise. The method has capabilities of an order of magnitude reduction in noise energy and several orders of magnitude enhancement in temporal contrast.

2 Claims, 3 Drawing Sheets

METHOD FOR FILTERING NOISES IN OPTICAL PARAMETRIC CHIRPED-PULSE AMPLIFIER AND DEVICE THEREFOR

CROSS REFERENCE OF RELATED APPLICATION

This Application claims priority under 35 U.S.C. 119(a-d) to CN 201410135997.1, filed Apr. 4, 2014.

BACKGROUND OF THE PRESENT INVENTION

1. Field of Invention

The present invention relates to a technical field of ultra-short laser amplification, and more particularly to a method for noise filtering in an optical parametric chirped-pulse amplifier and a device therefor.

2. Description of Related Arts

The seed beam in a conventional optical parametric chirped-pulse amplifier (OPCPA) is only temporally chirped. During the parametric amplification, the seed generally suffer from three kinds of noises: parametric super-fluorescence (PSF), pump distortion-induced noise (PDN) and surface-reflection-initiated pre-pulses (SRP). These noises then transform into broad pedestals or isolated side-pulses located around the intense main pulse after the amplified signal is compressed, which limit the temporal contrast of the amplified ultra-short pulse to the level of $10^8 \sim 10^9$. This contrast bottleneck arises as a combined result of the seed pulse's quality, noises from amplification and imperfections in stretcher and compressor. Contrast enhancement is always one of the most difficult problems in high peak-power laser engineering and application. Conventional technologies of pulse cleaning such as saturable absorber and cross-polarized wave generation are only applicable for cleaning the seed pulse with energy generally less than 1 mJ. There is few solution to the contrast degradation during the amplification course.

The difficulty of filtering noises that grow during amplification comes from the fact that the noises and signal usually overlap each other in all of the spatial, temporal and spectral domains. Despite the noises present different temporal structures with the main pulse after compression, there is so far no efficient temporal filtering technology with controlled switching time at femtosecond scale. The nonlinear temporal domain filtering technologies that have been used in cleaning seed pulses such as cross-polarized wave generation, are not applicable at the end of the amplifier due to the low energy conversion efficiencies of 10%-30%.

SUMMARY OF THE PRESENT INVENTION

An object of the present invention is to provide a method for filtering the noises that grow during parametric amplification in OPCPA systems, to solve the bottle problem of poor temporal contrast of high peak-power lasers based on optical parametric chirped-pulse amplifiers.

Principals of the present invention are described as follows.

The filtering of the several kinds of noises that grow in parametric amplifiers is realized via dressing the injected seed beam with spatial chirp. In conventional OPCPA systems, the seed beam is only temporally chirped. But in the present invention, appropriate amount of spatial chirp is innovatively introduced into the seed beam before being injected into the amplifier by a stretcher, i.e., the signal pulse under amplification has temporal and spatial chirp simultaneously. The various noises that occur during amplification, however, do not have the temporal and spatial chirp. A compressor is used after the amplifier to introduce spatial and temporal dispersions that closely match the dispersions produced by the stretcher, but opposite in sign. When the amplified signal passes through this compressor, the carried temporal and spatial chirp can be removed completely, hence the signal pulse restores to its original ultra-short pulse duration. However, for the noises that don't have temporal and spatial chirp, when they pass through the compressor, they acquire the spatiotemporal dispersions, i.e., simultaneous temporal and spatial chirp. Thus the noises manifest as a spatiotemporal-coupling distributed noise background at the compressor output, i.e., there is a linear interdependence of temporal and spatial distribution. This coupling makes the noises highly distinguishable from the main pulse in both time and space; hence, it supports efficient and simple noise filtering implemented in the spatial domain. By inserting a spatial filter component, such as a slit or aperture, in the near-field right at the compressor output, the noises that are spatially dispersed to areas out of the beam profile of the main pulse can be easily filtered out. The method works well for all the three kinds of noises in optical parametric chirped-pulse amplifiers, including PSF, PDN and SRP.

Technical solutions of the present invention are as follows.

A method for filtering noises in an optical parametric chirped-pulse amplifier comprises four steps: generating a seed beam dressed with spatial chirp, conducting optical parametric amplification, removing temporal and spatial chirp in amplified signal, and filtering noises in spatial domain; wherein 1) the step of generating the seed beam dressed with the spatial chirp is realized by using a single-pair grating stretcher configuration, which has functions of producing a (stretched) chirped pulse that has simultaneous temporal and spatial chirp; the grating stretcher configuration of the present invention is different from a stretcher configuration in conventional OPCPAs; in conventional stretchers, after a laser beam passing through single-pair grating, the beam will be reflected back into the stretcher to eliminate the spatial chirp; in the present invention, instead of eliminating the spatial chirp, the spatial chirp is deliberately left to form a spatial-chirp-dressed seed beam, thus the seed beam does not need to be reflected back after the first leg of passing through the single-pair gratings;

2) the step of conducting the optical parametric amplification is realized by using a nonlinear optical crystal or multiple nonlinear optical crystals in series; the spatial-chirp dressed seed beam generated in the step 1) is injected into the nonlinear optical crystal for parametric amplification;

3) the step of removing the temporal and spatial chirp is realized by a compressor comprising a pair of parallelly-placed gratings; the compressor operates on the same principle with the stretcher in the step 1), for providing spatial and temporal dispersions that closely matches dispersions produced by the stretcher, but opposite in sign; after the amplified signal pulse output from the step 2) passes through the pair of gratings, the temporal and spatial chirp are removed completely, and the amplified signal is compressed close to its original pulse duration, in such a manner that a ultra-short laser pulse with very high peak-power is output.

4) the step of filtering the noises in the spatial domain is realized by using a one-dimensional slit or aperture at the output of the step 3); the slit or aperture has its center aligning with the output beam of the step 3) and its width equal to the beam width in the transverse dimension where the spatial chirp exists.

A device for realizing the above method comprises: an ultra-short pulsed-laser source, a stretcher for generating a spatial-chirp-dressed seed beam, an optical parametric amplifier, a compressor for removing temporal and spatial chirp and a spatial filter for noise filtering; wherein the stretcher comprises a first reflector, a first grating, a first imaging lens, a second imaging lens, a second grating and a second reflector provided in order along the beam propagation direction; the compressor comprises a third reflector, a third grating, and a fourth grating that is opposite to and parallel with the third grating; These components are provided in order along the beam propagation direction too.

The gratings in the stretcher and compressor can be replaced with prisms.

These and other objectives, features, and advantages of the present invention will become apparent from the following detailed description, the accompanying drawings, and the appended claims.

Figure 1:
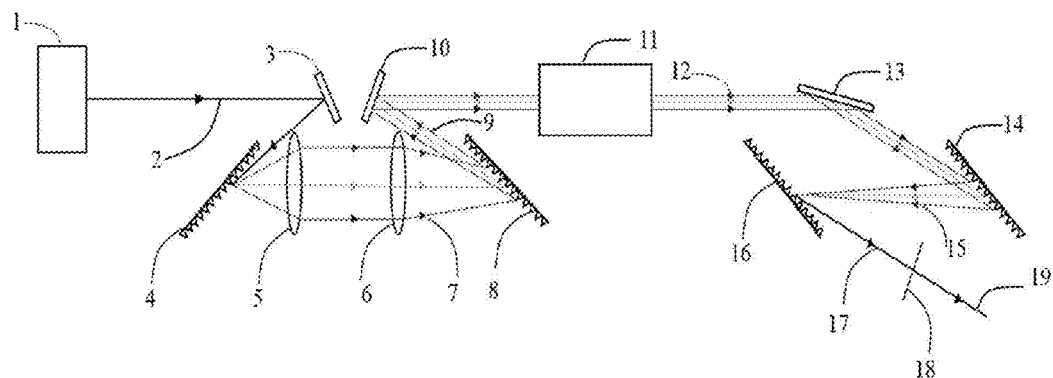
FIG. 1 shows a device of a method for filtering noises in an optical parametric chirped-pulse amplifier according to a preferred embodiment of the present invention.

Reference numbers in FIG. 1 are described as follows. 1—ultrashort pulsed-laser source; 2—ultrashort seed pulse; 3—first reflector; 4—first grating in stretcher; 5—first imaging lens; 6—second first imaging lens; 7—laser beam with angular dispersion, temporal chirp (positive chirp) and spatial chirp; 8—second grating in stretcher; 9—spatial-chirp-dressed seed beam seed beam; 10—second reflector; 11—nonlinear optical crystal for parametric amplification; 12—amplified signal beam; 13—third reflector; 14—third grating; 15—laser beam with angular dispersion but no temporal and spatial chirp; 16—fourth grating; 17—compressed signal pulse-beam that contains a noise background; 18—slit used for spatial filtering; 19—ultra-short pulse after noise filtering.

DETAILED DESCRIPTION OF THE PREFERRED EMBODIMENT

The present invention is further described according to a group of numerical simulation results.

FIG. 1 shows a schematic view of a device using a method of spatial-chirp-dressed seed beam and near-filed noise filtering in an optical parametric chirped-pulse amplifier. The method comprises steps of: generating a seed beam dressed with spatial chirp, conducting optical parametric amplification, removing temporal and spatial chirp, and filtering noise in spatial domain.

Ultrashort seed pulse 2 emitted by ultrashort pulsed-laser source 1 is reflected by first reflector 3 to first grating in stretcher 4. After being diffracted by first grating in stretcher 4, ultrashort seed pulse 2 acquires an angular dispersion. Group-velocity dispersion is introduced when the pulse propagates away from first grating in stretcher 4 and transit-time dispersion increases with the propagation. When the desired dispersion is achieved after the pulse passing through first imaging lens 5 and second imaging lens 6, a second inverted grating 8 is used to recollimate laser beam with angular dispersion 7 by compensating for the angular dispersion. In this way a temporal chirp and a spatial chirp are simultaneously frozen in spatial-chirp-dressed seed beam seed beam 9. This seed beam is reflected by second reflector 10 to nonlinear optical crystal for parametric amplification 11. During amplification course, noises of PSF, PDN, and SRP are imparted onto the seed beam, so the amplified signal beam 12 contains not only the spatial-chirp-dressed signal pulse but also the noises. The amplified signal beam 12 is then reflected by a third reflector 13 to a third grating 14 for compression. The third grating 14 introduces group velocity dispersion that has opposite sign with that contained in the amplified signal beam 12 and the spatial and temporal chirp in the amplified signal beam 12 can be completely compensated. Thus a laser beam with angular dispersion but no temporal and spatial chirp 15 is obtained. A fourth grating 16 is used to recollimate the laser beam by compensating the angular dispersion. Then a compressed signal pulse-beam that contains a noise background 17 is obtained. For the noises in the amplified laser beam 12, when they are projected onto the third grating 14, different frequency components acquire different emergent angles. After propagating through the optical path between the third grating 14 and fourth grating 16, a spatial chirp and a temporal chirp are introduced into the noise fields. With this simultaneous temporal and spatial chirp, a spatiotemporal coupling occurs in the noise distribution. A slit used for spatial filtering 18 is then added to block out the noises out of the beam profile of the main pulse. Due to the linear spatiotemporal coupling induced by simultaneous temporal and spatial chirp, the slit used for spatial filtering 18 also acts as a temporal shutter. Thus, an ultra-short pulse after noise filtering 19 has its temporal contrast significantly enhanced.

Parameters used in the numerical simulation are shown in Table 1.

TABLE 1

Definitions and values of the parameters used in the numerical simulation

| | Parameter | Symbol | Value |
|---|---|---|---|
| Injected seed | Central wavelength | $\lambda_s$ | 810 nm |
| | Bandwidth (1/e half width) | $\Delta\omega$ | 30 THz |
| | Beam aperture | $\sigma_0$ | 1 mm |
| | Temporal chirp coefficient | C | 150 |

TABLE 1-continued

Definitions and values of the parameters used in the numerical simulation

| | Parameter | Symbol | Value |
|---|---|---|---|
| | Spatial chirp coefficient | u | 2 |
| | Input energy | / | 1 nJ |
| Pump | Wavelength | $\lambda_p$ | 527 nm |
| | Intensity | $I_p$ | 2.2 GW/cm$^2$ |
| Crystal for parametric amplification | Type | / | β-BBO |
| | Phase matching configuration | / | type I |
| | Length | L | 11 mm |

The spatial-spectral distribution of the spatial-chirp-dressed seed beam can be expressed by $$\tilde{A}_0(x,\omega) = \exp\left[-\frac{1}{2}\left(\frac{\omega}{\Delta\omega}\right)^2(1-iC)\right]\exp\left\{-\frac{1}{2}\left[\frac{x-(u\sigma_0/\Delta\omega)\omega}{\sigma_0}\right]^2\right\}.$$

Figure 2:
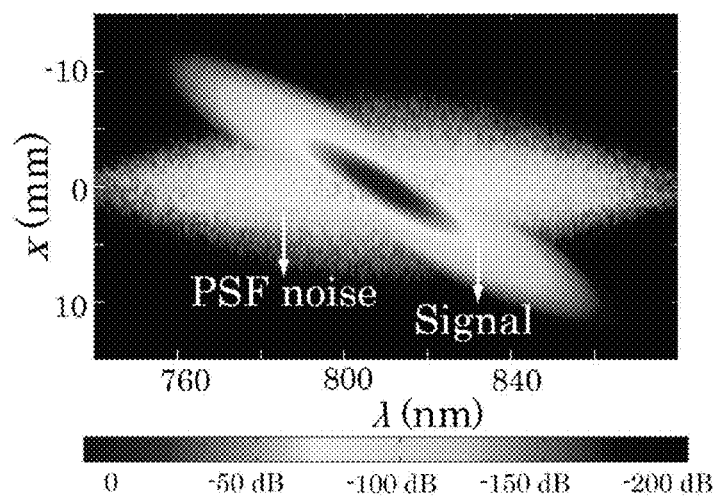
FIG. 2 shows spatial-spectral intensity distribution of a laser field output from an optical parametric amplifier using a spatial-chirp-dressed seed beam, wherein PSF is taken into consideration as the noise mechanism during amplification, according to the preferred embodiment of the present invention.

FIG. 2 shows the spatial-spectral intensity distribution of the spatial-chirp-dressed signal beam after parametric amplification, wherein the PSF noise during parametric amplification is taken into account. A spatial-spectral coupling appears in the signal due to the existence of the spatial chirp. The PSF noise background that is independently produced in the amplification course, however, does not have such spatial-spectral coupling.

Figure 3:
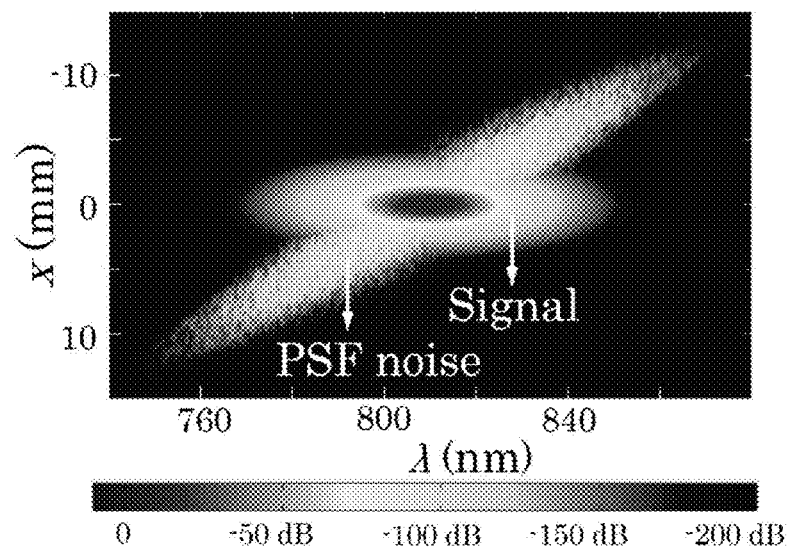
FIG. 3 shows spatial-spectral intensity distribution of amplified laser field after compressor, wherein temporal and spatial chirp have been removed from the signal completely, according to the preferred embodiment of the present invention.

FIG. 3 shows the spatial-spectral intensity distribution of the amplified signal after compressor. As the compressor removes both the temporal and spatial chirp introduced by stretcher, the spatial-spectral coupling in the signal beam is fully eliminated and the amplified signal restores to a conventional ultra-short pulse. Due to the removal of spatial chirp, the beam width of the signal decreases by $(1+u^2)^{1/2}$ times. In the meantime, the PSF noise acquires a spatial-spectral coupling, as shown in FIG. 3, and the transverse size of the noise field increases by $(1+u^2)^{1/2}$ times. Therefore, the signal beam and PSF noise field have their overlapped area reduced by about $(1+u^2)$ times and become highly distinguishable in space.

Figure 4:
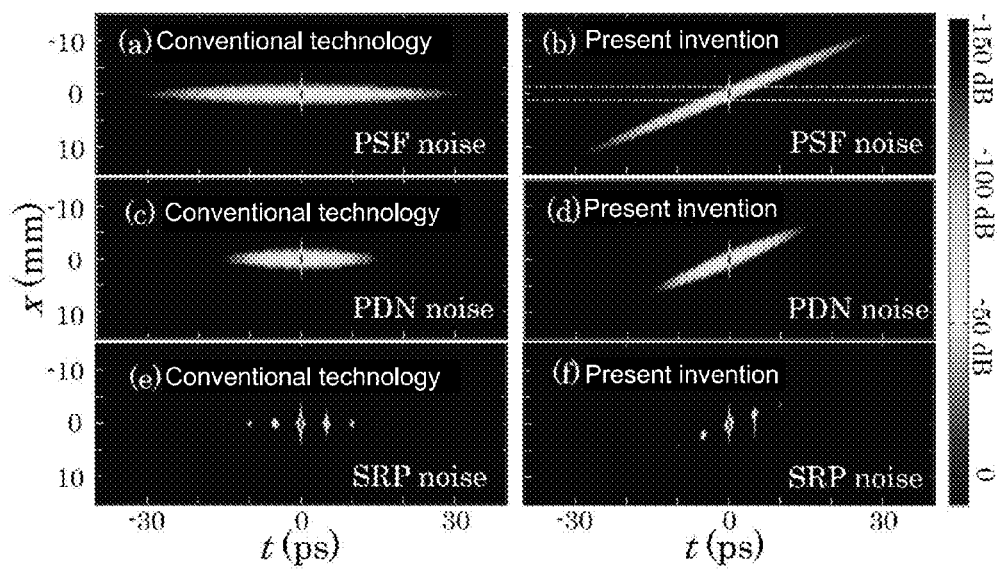
FIG. 4 shows spatiotemporal profiles of compressed amplified laser fields from OPCPAs not using (FIGS. 4(a), 4(c) and 4(e)) and using (FIGS. 4(b), 4(d) and 4(f)) spatial-chirp-dressed seed beams, wherein PSF (FIGS. 4(a) and 4(b)), PDN (FIGS. 4(c) and 4(d)), and SRP (FIGS. 4(e) and 4(f)) noises are taken into consideration respectively, according to the preferred embodiment of the present invention.

FIG. 4 presents the spatiotemporal profiles of the compressed amplified laser fields from OPCPA systems not using and using spatial-chirp-dressed seed beams respectively. FIG. 4(b) shows the spatiotemporal intensity distribution of the same laser field given in FIG. 3. Whereas the spatial-chirp-dressed signal turns into an ultra-short pulse without spatiotemporal coupling, the PSF noise exhibits a linear spatiotemporal coupling with a coupling coefficient of 2.5 ps/mm. With this coupling, the temporal noise structures located away from the peak of the main pulse are mapped to transverse positions away from the beam center. Thus a spatial slit can act as a temporal shutter. FIGS. 4(b) and 4(c) present the similar results for OPCPAs where the PDN and SRP noises are taken into consideration respectively. A linear spatiotemporal coupling with the same coupling coefficient is similarly introduced into the PDN and SRP noise background, indicating that these two noises can also be efficiently filtered by the method of present invention. In a conventional OPCPA, the PSF, PDN and SRP noises at the compressor output does not have such spatiotemporal couplings, as shown in FIG. 4(a), FIG. 4(c) and FIG. 4(e). In this case, the noise background and the main pulse almost overlap completely in their spatial distribution, thus noise filtering in the spatial domain is impossible.

Figure 5:
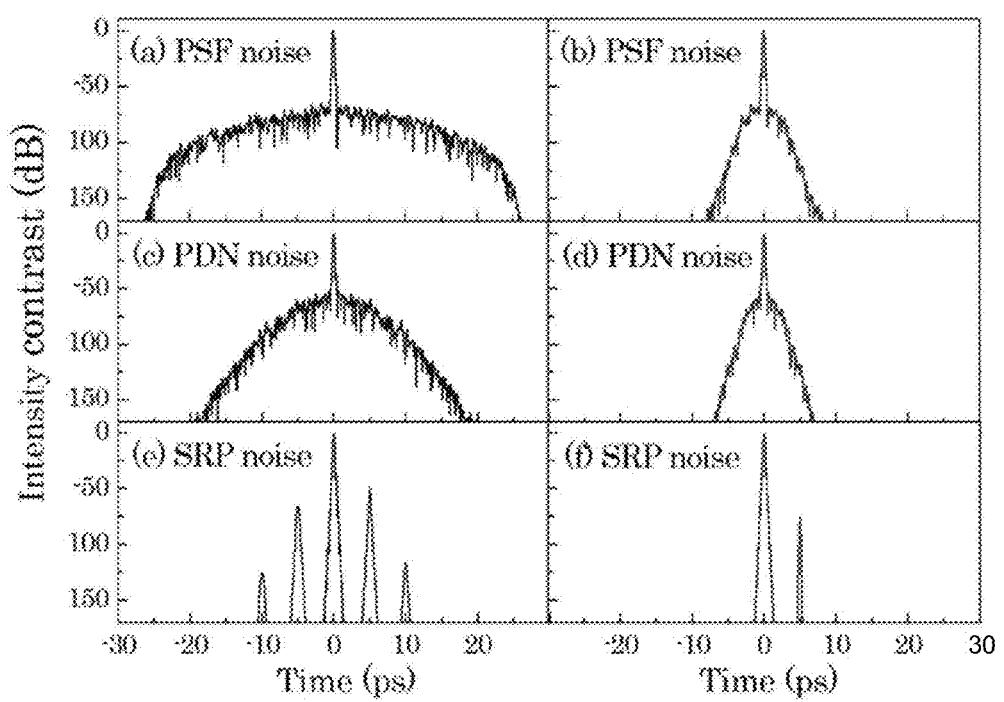
FIG. 5 shows temporal contrast of compressed amplified laser fields from conventional OPCPAs (FIGS. 5(a), 5(c) and 5(e)) and OPCPAs using the noise filtering method of the present invention (FIGS. 5(b), 5(d) and 5(f)), wherein the PSF (FIGS. 5(a) and 5(b)), PDN (FIGS. 5(c) and 5(d)), and SRP (FIGS. 5(e) and 5(f)) noises are taken into consideration respectively, according to the preferred embodiment of the present invention.

FIG. 5 shows the temporal contrast of the compressed amplified laser fields at focus from conventional OPCPAs and OPCPAs using the noise filtering method of present invention. FIGS. 5(a), 5(c) and 5(e) present the temporal profiles of the amplified pulses at the focus in conventional OPCPAs, with PSF, PDN and SRP noises taken into consideration respectively. FIGS. 5(b), 5(d) and 5(f) show the temporal profiles of the amplified pulses in FIGS. 4(b), 4(d) and 4(f) at the focus, wherein the near-field noise filtering is adopted. A same near-field slit (99% transmittance for the signal beam) is used for filtering all the tree noises. These results indicate that the temporal extension of the noise background is reduced significantly after implementing the near-field filtering, as a common feature for all the three kinds of noises. For example, the temporal contrast at t=−5 ps is enhanced from $10^6$ to $>10^{13}$ for PSF and PDN noises. While for SRP noise, the −5 ps contrast, i.e. the first-order pre-pulse contrast, can be improved more sufficiently from $10^6$ to $>10^{15}$. These results indicate that the proposed method of using a spatial-chirp-dressed seed beam provides a general effective noise filtering approach for parametric amplifiers. In particular, it is a linear noise filtering method that will not impose losses on the main pulse unlike the conventional nonlinear filtering approaches.

In conclusion, the method of dressing the seed beam with a small amount of spatial chirp makes it possible to filter the noises that grow during the amplification course, as an equivalent linear temporal shutter can be created via the spatiotemporal coupling induced by the introduced spatial chirp, in combination with using a near-field slit. The method could be applied to generate ultra-short pulses having ultra-high temporal contrast and high power, which are very critical in high-intensity laser-matter interaction experiments.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for filtering noises in an optical parametric chirped-pulse amplifier comprising steps of:
   1) generating a seed beam dressed with spatial chirp, which is realized by using a single-pair grating stretcher configuration, which has functions of producing a (stretched) chirped pulse that has simultaneous temporal and spatial chirp; instead of eliminating the spatial chirp, the spatial chirp is deliberately left to form a spatial-chirp-dressed seed beam, thus the seed beam does not need to be reflected back after a first leg of passing through the single-pair gratings;
   2) conducting optical parametric amplification, which is realized by using a nonlinear optical crystal or multiple nonlinear optical crystals in series; the spatial-chirp dressed seed beam generated in the step 1) is injected into the nonlinear optical crystal for parametric amplification;
   3) removing temporal and spatial chirp in amplified signal, which is realized by a compressor comprising a pair of parallelly-placed gratings; the compressor operates on the same principle with the stretcher in the step 1), for providing spatial and temporal dispersions that closely matches dispersions produced by the stretcher, but opposite in sign; after the amplified signal pulse output from the step 2) passes through the pair of gratings, the temporal and spatial chirp are removed completely, and the amplified signal is compressed close to its original pulse duration, in such a manner that an ultra-short laser pulse with very high peak-power is output; and 4) filtering noises in spatial domain, which is realized by using a one-dimensional slit or aperture at an output of the step 3); the slit or aperture has its center aligning with the output beam of the step 3) and its width equal to the beam width in the transverse dimension where the spatial chirp exists.

2. A device for realizing the method, as recited in claim 1, comprising: an ultra-short pulsed-laser source, a stretcher that produces a seed beam dressed with spatial chirp, nonlinear crystals for optical parametric amplification, a compressor for removing the temporal and spatial chirp introduced by the stretcher and a spatial filter for noise filtering.

* * * * *